(12) United States Patent
Kolton et al.

(10) Patent No.: US 10,015,193 B2
(45) Date of Patent: Jul. 3, 2018

(54) METHODS AND DEVICES FOR IDENTIFYING THE PRESENCE OF MALWARE IN A NETWORK

(71) Applicant: TopSpin Security LTD., Herzelia (IL)

(72) Inventors: Doron Kolton, Pardesia (IL); Rami Mizrahi, Herzelia (IL); Manor Hemel, Kibbutz Kabri (IL); Omer Zohar, Rishon-Lezion (IL)

(73) Assignee: TOPSPIN SECURITY LTD, Herzelia (IL)

( * ) Notice: Subject to any disclaimer, the term of this patent is extended or adjusted under 35 U.S.C. 154(b) by 301 days.

(21) Appl. No.: 14/956,639

(22) Filed: Dec. 2, 2015

(65) Prior Publication Data

US 2016/0112440 A1    Apr. 21, 2016

Related U.S. Application Data

(63) Continuation-in-part of application No. PCT/IB2014/061957, filed on Jun. 4, 2014.
(Continued)

(51) Int. Cl.
*H04L 29/06* (2006.01)
*H04L 29/08* (2006.01)
(Continued)

(52) U.S. Cl.
CPC .......... *H04L 63/145* (2013.01); *G06F 21/567* (2013.01); *G06F 21/577* (2013.01);
(Continued)

(58) Field of Classification Search
CPC . H04L 63/145; H04L 63/101; H04L 63/1416; H04L 63/1425; H04L 69/16;
(Continued)

(56) References Cited

U.S. PATENT DOCUMENTS 7,698,442 B1    4/2010   Krishnamuthy et al.
8,069,484 B2   11/2011   McMillan et al.
(Continued)

OTHER PUBLICATIONS

"Client-Side Defense Against Web Based Identity Theft", NDSS, 2004, Chou Neil, et al, http://theory.stanford.edu/~jcm/papers/spoofguard-ndss.pdf, Dec. 31, 2004.

*Primary Examiner* — Kambiz Zand
*Assistant Examiner* — Aubrey Wyszynski
(74) *Attorney, Agent, or Firm* — Michael J. Feigin, Esq.; Feigin and Fridman

(57) ABSTRACT

A device and a method for identifying whether a network node is infected by malware, including identifying indicator events for each of a plurality of anomaly indicators, by counting the number of occurrences of an anomaly indicator in at least one of a network node and an entire network during a predetermined time duration and if the number of occurrences of the anomaly indicator during the predetermined time duration is greater than a predetermined event threshold, identifying an indicator event associated with the anomaly indicator during the predetermined time duration and assigning an expiration duration for the indicator event, determining whether the identified indicator events fulfill at least one predetermined infection rule, and if the indicator events fulfill the at least one predetermined infection rule, identifying the network node as infected by malware.

24 Claims, 7 Drawing Sheets

Related U.S. Application Data

(60) Provisional application No. 61/831,677, filed on Jun. 6, 2013.

(51) Int. Cl.
  *G06F 21/56* (2013.01)
  *G06F 21/57* (2013.01)

(52) U.S. Cl.
  CPC ........ *H04L 63/101* (2013.01); *H04L 63/1416* (2013.01); *H04L 63/1425* (2013.01); *H04L 69/16* (2013.01); *G06F 2221/2119* (2013.01); *H04L 67/02* (2013.01)

(58) Field of Classification Search
  CPC ..... H04L 67/02; G06F 21/577; G06F 21/567; G06F 2221/2119
  USPC .......................................................... 726/1
  See application file for complete search history.

(56) References Cited

U.S. PATENT DOCUMENTS

| | | | |
|---|---|---|---|
| 8,307,431 B2 | 11/2012 | Krishnamuthy et al. | |
| 8,312,536 B2 | 11/2012 | Nachenberg et al. | |
| 8,341,740 B2 | 12/2012 | Abdel-Aziz et al. | |
| 8,443,452 B2 | 5/2013 | Koulinitch et al. | |
| 8,528,088 B2 | 9/2013 | Wright et al. | |
| 8,555,385 B1 | 10/2013 | Bhatkar et al. | |
| 8,566,943 B2 | 10/2013 | Martynenko et al. | |
| 8,607,341 B2 | 12/2013 | Wright | |
| 8,850,584 B2 * | 9/2014 | Alme | G06F 21/552 726/22 |
| 9,430,646 B1 * | 8/2016 | Mushtaq | G06F 21/554 |
| 2008/0082662 A1 | 4/2008 | Dandliker et al. | |
| 2009/0126012 A1 | 5/2009 | Treadwell et al. | |
| 2009/0245109 A1 * | 10/2009 | Hurley | H04L 41/142 370/235 |
| 2011/0023115 A1 | 1/2011 | Wright | |
| 2011/0219450 A1 | 9/2011 | McDougal et al. | |
| 2011/0320816 A1 | 12/2011 | Yao et al. | |
| 2012/0255010 A1 | 10/2012 | Sallam | |
| 2012/0317644 A1 | 12/2012 | Kumar et al. | |
| 2013/0333033 A1 | 12/2013 | Khesin | |
| 2014/0007237 A1 | 1/2014 | Wright et al. | |
| 2014/0327573 A1 * | 11/2014 | Leibner | G01S 19/215 342/357.59 |

* cited by examiner ions are incorporated herein by reference as if fully
METHODS AND DEVICES FOR IDENTIFYING THE PRESENCE OF MALWARE IN A NETWORK

RELATED APPLICATIONS

The present application is a Continuation In Part National Phase application of PCT Patent Application No. PCT/IB2014/061957 Filed on Jun. 4, 2014 and entitled METHODS AND DEVICES FOR IDENTIFYING THE PRESENCE OF MALWARE IN A NETWORK, which gains priority from U.S. Provisional Patent Application No. 61/831,677 filed Jun. 6, 2013 and entitled DETECTING VULNERABILITY TO ADVANCED PERSISTENT THREAT IN COMPUTER NETWORKS, both of which applicat set forth herein.

FIELD AND BACKGROUND OF THE INVENTION

The invention, in some embodiments, relates to the field of computer threats, and more specifically to identifying the presence of advanced persistent threats, or malware, on a computer network node.

Advanced persistent threats, such as computer viruses, computer worms, Trojan horses, and other malware, are some of the problematic issues that organization Chief Security Officers (CSO) need to handle. Current security mechanisms are generally unable to cope with, and to prevent, targeted attacks on organizations, and as a result third parties, such as crackers and cyber-terrorists, are able to insert malware into the networks of such organizations. Once malware is present on an organization's network, the malware communicates with command and control mechanisms, which direct the malware as to what data to obtain, where to find such data, and where to send the data once it is obtained. Typically, communication between malware and its command and control uses common protocols, such as HTTP and IRC.

One method currently used for identifying the presence of malware on a network involves signature matching or pattern matching of malware families. For this method to properly identify the presence of malware, the malware must first be caught and analyzed to derive one or more relevant signatures, which signatures are then used to prevent an malware infection by such malware in other computers in the network or in other networks.

Another method, known as "sandboxing", involves running suspicious code in a secluded emulation environment, also called a sandbox, in order to identify the purpose of the code without the code being able to access network data. For example, a sandbox may be implemented by installing a proxy at the entrance to a network, and executing all HTTP pages prior to forwarding them to the requesting computer within the network. However, some malware programmers have developed methods for circumventing emulation environments, thus reducing the effectiveness of sandboxing. Additionally, even if the malware does not circumvent the emulation environment, execution of all HTTP requests in the sandbox prior to transmission thereof to the requesting node in the network greatly reduces the rate at which data is provided to the network nodes.

In yet other methods, machine learning, behavioral analysis, and classification algorithms are used to find packets within the network traffic which include communication between malware within the network and the control and command mechanism controlling the malware, or other suspicious activities in the network.

Recent reports show that on average, Advanced Persistent Threat attacks remain unidentified within an organization's network for longer than six months, and that more than 66% of organizations are unaware that their network is under attack.

There is thus a need for a system and method for effectively identifying the presence of malware in a computer network, and for identifying a command and control entity with which the malware communicates from within the network.

SUMMARY OF THE INVENTION

The invention, in some embodiments, relates to the field of computer threats, and more specifically to identifying the presence of advanced persistent threats, or malware, on a computer network node.

Some embodiments of the invention relate to methods and devices for identifying safe URIs, resources or pages accessed by nodes in a network, also known as white-listing resources or pages.

According to an aspect of some embodiments of the invention there is provided a method for identifying safe URIs (whitelisting), the method comprising:

each time a browser directly accesses a specific Uniform Resource Identifier (URI), building a browsing session based on the specific URI by:
   adding the specific URI to the browsing session; and
   adding to the browsing session each URI accessed through a URI already in the browsing session;
if the browsing session is valid, increasing a reputation score of the specific URI and all other URIs in the browsing session; and
if the reputation score of the specific URI is above a threshold or if the specific URI has previously been identified as a safe URI, identifying the specific URI and all other URIs included in the browsing session as safe URIs.

In some embodiments, directly accessing a specific URI comprises sending an HTTP request for the URI including a blank value in the request referrer field.

The specific URI may be a URI for any suitable resource, including web pages, text documents, images, sound files, multimedia files, executable files, and anything that can be accessed through a web site or through any web interface technology.

In some embodiments, the browsing session is valid if no anomaly was identified during addition of URIs to the browsing session, or following addition of URIs to the browsing session and prior to validation thereof. Devices and methods for detecting anomalies are described in further detail hereinbelow.

In some embodiment, the reputation score of a URI is aggregated for all users of the network. In some embodiments, the reputation score of a URI is aggregated for all users using the method herein to build a browsing session, which users may be using devices located in different networks.

In some embodiments, a safe resource is a resource which does not contain, generate, or infect the network node with malware.

The method for identifying safe resources described herein may be carried out using any suitable device. That being said, according to an aspect of some embodiments of the invention there is provided a device for identifying safe URIs (whitelisting), the device comprising:

a direct access identifier configured to identify when a browser of a node in a network directly accesses a specific Uniform Resource Identifier (URI);

a browsing session builder functionally associated with the direct access identifier and configured, following identification of direct access to the specific URI, to build a browsing session based on the specific URI by:

adding the specific URI to the browsing session; and adding to the browsing session each URI accessed through a URI already in the browsing session;

a browsing session validator configured to identify whether or not the browsing session is valid, and if the browsing session is valid to increase a reputation score of the specific URI and of all other URIs in the browsing session; and a safe resource identifier functionally associated with the browsing session validator and configured to identify the specific URI and all other URIs included in the browsing session as safe URIs if the reputation score of the specific URI is above a threshold or if the specific URI has previously been identified as a safe URI.

In some embodiments, the direct access identifier is configured to identify sending a request for the URI including a blank value in the request referrer field.

The specific URI may be a URI for any suitable resource, including web pages, text documents, images, sound files, multimedia files, executable files, and anything that can be accessed through a web site or through any web interface technology.

In some embodiments, the browsing session validator is configured to identify the browsing session as valid if no anomaly was identified during addition of URIs to the browsing session by the browsing session builder or following addition of URIs to the browsing session but prior to validation thereof by the browsing session validator. Devices and methods of detecting anomalies are described in further detail hereinbelow.

In some embodiment, the browsing session validator is configured to update the reputation scores of the URIs in the browsing session in a reputation aggregator functionally associated therewith. In some embodiments, the reputation aggregator is configured to aggregate the reputation score of a URI for all users of the network. In some embodiments, the reputation aggregator is configured to aggregate the reputation score of a URI for users of the network and of other networks using devices as described herein.

In some embodiments, the safe resource identifier is configured to identify as a safe resource a resource which does not contain, generate, or infect the network node with malware.

Some embodiments of the invention relate to methods and devices for identifying whether a network node is infected by malware.

According to an aspect of some embodiments of the invention there is provided a method for identifying whether a network node is infected by malware, the method comprising:

identifying indicator events for each of a plurality of anomaly indicators, by:

counting the number of occurrences of an anomaly indicator in at least one of a network node and a network during a predetermined time duration; and if the number of occurrences of the anomaly indicator during the predetermined time duration is greater than a predetermined event threshold, identifying an indicator event associated with the anomaly indicator during the predetermined time duration and assigning an expiration duration to the indicator event;

determining whether non-expired identified indicator events fulfill at least one predetermined infection rule; and if the indicator events fulfill the at least one predetermined infection rule, identifying the network node as infected by malware.

The anomaly indicators may be any suitable anomaly indicators. That said, in some embodiments, some of the plurality of anomaly indicators comprise indicators of global anomalies, which, when found, are relevant to all nodes of the network or even to other networks. For example, if a specific web page is identified as malware or as a malware control and command element, all guards in the network are notified of the nature of the web page, and any access to the specific web page, from any the node in the network, is considered an anomaly indicator. In some embodiments, some of the plurality of anomaly indicators comprise indicators of local anomalies, which are specific to the network node in which they were identified and/or to the browsing session in which they were identified.

Anomaly indicators may be based on any suitable network traffic protocol. That said, in some embodiments, anomaly indicators are based on HTTP traffic in the network. In some embodiments, anomaly indicators are based on DNS traffic in the network. In some embodiments, anomaly indicators are based on IRC traffic in the network. In some embodiments, anomaly indicators are based on FTP traffic in the network.

In some embodiments, the plurality of anomaly indicators includes anomaly indicators relating to URI access out of context of a browsing session of the network node, for example access to a URI in which the referrer field does not include any URI or includes a URI not previously included in the browsing session, other than at the beginning of a browsing session.

In some embodiments, the plurality of anomaly indicators includes anomaly indicators relating to access to a resource, such as a web page, which does not meet a pre-determined configuration profile. For example, a common web page is expected to have a title, a few images, and a few scripts. Absence of some or all of these elements in a page being accessed is abnormal and, in some embodiments, may be considered an anomaly indicator.

In some embodiments, the plurality of anomaly indicators includes anomaly indicators relating to DNS correspondence with IP addresses. For example, each access to a URI located at a specific IP address should trigger a corresponding DNS query. The absence of such a DNS query may be considered an anomaly indicator.

In some embodiments, the plurality of anomaly indicators includes anomaly indicators relating to a number of TCP connections opened during a browsing session. For example, a specific number of TCP connections is expected for each browsing session. Opening of a smaller or greater number of TCP connections during the browsing session may be considered an anomaly indicator.

In some embodiments, the plurality of anomaly indicators includes anomaly indicators relating to the user agent attribute of an HTTP request in a browsing session. For example, all HTTP requests in a given browsing session are expected to have the same value in the "User Agent" header of the request. An HTTP request having a different value in the "User Agent" header is often a request which did not originate from the browser but from another tool or source, such as from malware. Therefore, identification of an HTTP request having a different "User Agent" value than all other requests in the browsing session may be considered an anomaly indicator.

In some embodiments, the plurality of anomaly indicators includes anomaly indicators relating to the type of traffic passing through a single TCP connection. For example, a TCP connection is expected to carry only HTTP traffic. Identification of non HTTP traffic, such as a stream of data, passing through a TCP connection, may be indicative of a TCP connection to a malware command and control web server which would know how to parse the stream of data, and thus may be considered an anomaly indicator.

In some embodiments, the plurality of anomaly indicators includes anomaly indicators relating to the longevity of domains accessed during the browsing session. For example, an anomaly indicator may be identified when the browsing session of a network node accesses a domain having a short lifespan.

In some embodiments, the plurality of anomaly indicators includes anomaly indicators relating to the HTML content of an HTTP response in the browsing session. In some embodiments, the plurality of anomaly indicators includes anomaly indicators relating to the HTML tags of an HTTP response in the browsing session. In some embodiments, the plurality of anomaly indicators includes anomaly indicators relating to the HTML content of all HTTP responses in the browsing session. In some embodiments, the plurality of anomaly indicators includes anomaly indicators relating to the HTML tags of all HTTP responses in the browsing session. In some embodiments, the plurality of anomaly indicators includes anomaly indicators relating to the length of the browsing session.

In some embodiments, the predetermined time duration is the same for all types of anomaly indicators. In some embodiments, the predetermined time duration is specific to each type of anomaly indicator in the plurality of anomaly indicators. In some embodiments, the predetermined time duration is specific to the network node.

In some embodiments, the predetermined event threshold is the same for all types of anomaly indicators. In some embodiments, the predetermined event threshold is specific to each type of anomaly indicator in the plurality of anomaly indicators. In some embodiments, the predetermined event threshold is specific to the network node.

In some embodiments, the expiration duration is the same for indicator events of all types of anomaly indicators. In some embodiments, the expiration duration is specific to indicator events of each type of anomaly indicator in the plurality of anomaly indicators.

The predetermined infection rule may be any suitable rule relating to the indicator events which, when fulfilled, indicates infection of a node by malware.

In some embodiments, the predetermined infection rule comprises a rule relating to a set of indicator events seen during a rule time duration. For example, the rule may state that seeing at least one indicator event of each of three different types of anomaly indicators is indicative of an infected network node. As another example, the rule may state that seeing at least two local, or browsing session specific, indicator events of two different types of anomaly indicators, as well as at least two global, or network general, indicator events, is indicative of an infected network node.

In some embodiments, the predetermined rule comprises a rule relating to a sequence of indicator events seen during a rule time duration. For example, the rule may specify a specific order of indicator events of different types of anomaly indicators, which is indicative of an infected node.

In some embodiments, the method also comprises assigning a score to each indicator event and the predetermined rule comprises a rule relating to an arithmetic operation of the scores of indicator events identified in the network node during a predetermined rule duration. In some such embodiments, the rule comprises identifying the network node as being infected if a sum, average, or weighted average of the scores of indicator events is above a predetermined infection threshold. In some such embodiments, the rule comprises identifying the network node as being infected if the result of subtraction of the scores of indicator events from an initial value is below a predetermined infection threshold.

The browsing session used to determine whether or not a network node is infected with malware may be created in any suitable way. That being said, in some embodiments the browsing session is created by creating an empty browsing session, when the user directly accesses a specific URI, adding the specific URI to the browsing session, and adding to the browsing session each URI accessed through a URI already in the browsing session.

In some embodiments, identifying indicator events comprises identifying indicator events in traffic within a Local Area Network (LAN) of which the network node forms part. In some embodiments, identifying indicator events comprises identifying indicator events in traffic between the network and IP addresses outside the network, such as, for example, within a Wide Area Network (WAN) including the network of which the network node forms part.

In some embodiments, the method for identifying an infected network node is carried out inline. In some such embodiments, the method also includes directing all traffic in the network through a proxy, and the identifying indicator events and identifying the network node are carried out by the proxy. In some such embodiments, the method also includes using at least one tool to identify whether a human user is conducting the browsing session. The tool may be any suitable tool, and may include one or more of identifying mouse movements, identifying suitable CPU usage patterns, or requesting that the user respond to a Captcha challenge.

In some embodiments, the method for identifying an infected network node is carried out out-of-line. In some such embodiments, copies of the traffic in the network or in part of the network are used for identifying indicator events without disrupting traffic flow in the network.

The method for identifying whether a network node is infected by malware can be carried out using any suitable device. That being said, according to an aspect of some embodiments of the invention there is also provided a device for identifying whether a network node is infected by malware, the device comprising:

an indicator event identifier, configured to identify indicator events for each of a plurality of anomaly indicators, by:
  counting the number of occurrences of an anomaly indicator in at least one of a network node and a network during a predetermined time duration; and
  if the number of occurrences of the anomaly indicator during the predetermined time duration is greater than a predetermined event threshold, identifying an indicator event associated with the anomaly indicator during the predetermined time duration and assigning an expiration duration to the identified indicator event;

a rule evaluator functionally associated with the indicator event identifier and configured to determine whether non-expired identified indicator events fulfill at least one predetermined infection rule; and an infection identifier functionally associated with the rule evaluator and configured to identifying the network node as infected by malware if the rule evaluator determined that the indicator events fulfill the at least one predetermined infection rule.

In some embodiments, the indicator event identifier is configured to identify indicator events for global anomaly indicators, which, when found, are relevant to all nodes of the network or even to other networks. For example, if a specific web page is identified as malware or as a malware control and command element, all guards are notified of the nature of the web page, and any access to the specific web page, from any the node in the network, is considered an anomaly indicator. In some embodiments, the indicator event identifier is configured to identify indicator events for local anomaly indicators, which are specific to the network node in which they were identified and/or to the browsing session in which they were identified.

The anomaly event indicator may identify indicator events for anomaly indicators based on any suitable network traffic protocol. That said, in some embodiments, the indicator event identifier is configured to identify indicator events for anomaly indicators based on HTTP traffic in the network. In some embodiments, the indicator event identifier is configured to identify indicator events for anomaly indicators based on DNS traffic in the network. In some embodiments, the indicator event identifier is configured to identify indicator events for anomaly indicators based on IRC traffic in the network. In some embodiments, the indicator event identifier is configured to identify indicator events for anomaly indicators based on FTP traffic in the network.

In some embodiments, the indicator event identifier is configured to identify indicator events for anomaly indicators relating to URI access out of context of a browsing session of the network node, for example access to a URI in which the referrer field does not include any URI or includes a URI not included in the browsing session, other than at the beginning of a browsing session.

In some embodiments, the indicator event identifier is configured to identify indicator events for anomaly indicators relating to access to a resource, such as a web page, which does not meet a pre-determined configuration profile. For example, a common web page is expected to have a title, a few images, and a few scripts. Absence of some or all of these elements in a page being accessed is abnormal and, in some embodiments, may be considered an anomaly indicator.

In some embodiments, the indicator event identifier is configured to identify indicator events for anomaly indicators relating to DNS correspondence with IP addresses. For example, each access to a URI located at a specific IP address should trigger a corresponding DNS query. The absence of such a DNS query may be considered an anomaly indicator.

In some embodiments, the indicator event identifier is configured to identify indicator events for anomaly indicators relating to a number of TCP connections opened during a browsing session. For example, a specific number of TCP connections is expected for each browsing session. Opening of a smaller or greater number of TCP connections during the browsing session may be considered an anomaly indicator.

In some embodiments, the indicator event identifier is configured to identify indicator events for anomaly indicators relating to the user agent attribute of an HTTP request in a browsing session. For example, all HTTP requests in a given browsing session are expected to have the same value in the "User Agent" header of the request. An HTTP request having a different value in the "User Agent" header is often a request which did not originate from the browser but from another tool or source, such as from malware. Therefore, identification of an HTTP request having a different "User Agent" value than all other requests in the browsing session may be considered an anomaly indicator.

In some embodiments, the indicator event identifier is configured to identify indicator events for anomaly indicators relating to the type of traffic passing through a single TCP connection. For example, a TCP connection is expected to carry only HTTP traffic. Identification of non HTTP traffic, such as a stream of data, passing through a TCP connection, may be indicative of a TCP connection to a malware command and control web server which would know how to parse the stream of data, and thus may be considered an anomaly indicator.

In some embodiments, the indicator event identifier is configured to identify indicator events for anomaly indicators relating to the longevity of domains accessed during the browsing session. For example, an anomaly indicator may be identified when the browsing session of a network node accesses a domain having a short lifespan.

In some embodiments, the indicator event identifier is configured to identify indicator events for anomaly indicators relating to the HTML content of an HTTP response in the browsing session. In some embodiments, the indicator event identifier is configured to identify indicator events for anomaly indicators relating to the HTML tags of an HTTP response in the browsing session. In some embodiments, the indicator event identifier is configured to identify indicator events for anomaly indicators relating to the HTML content of all HTTP responses in the browsing session. In some embodiments, the indicator event identifier is configured to identify indicator events for anomaly indicators relating to the HTML tags of all HTTP responses in the browsing session. In some embodiments, the indicator event identifier is configured to identify indicator events for anomaly indicators relating to the length of the browsing session.

In some embodiments, the predetermined time duration is the same for all types of anomaly indicators. In some embodiments, the predetermined time duration is specific to each type of anomaly indicator in the plurality of anomaly indicators. In some embodiments, the predetermined time duration is specific to the network node.

In some embodiments, the predetermined event threshold is the same for all types of anomaly indicators. In some embodiments, the predetermined event threshold is specific to each type of anomaly indicator in the plurality of anomaly indicators. In some embodiments, the predetermined event threshold is specific to the network node.

In some embodiments, the expiration duration is the same for indicator events of all types of anomaly indicators. In some embodiments, the expiration duration is specific to indicator events of each type of anomaly indicator in the plurality of anomaly indicators.

The rule evaluator is configured to evaluate whether or not the identified indicator events fulfill any suitable rule relating to the indicator events, which rule, when fulfilled, indicates infection of a node by malware.

In some embodiments, the rule evaluator is configured to determine whether the identified indicator events fulfill an infection rule relating to a set of indicator events seen during a rule time duration. For example, the rule evaluator may determine whether or not the identified indicator events fulfill a rule requiring identification of at least one indicator event of each of three different types of anomaly indicators within a rule time duration. As another example, the rule evaluator may determine whether or not the identified indicator events fulfill a rule requiring identification of at least two local, or browsing session specific, indicator events of two different types of anomaly indicators, as well as at least two global, or network general, indicator events, within a rule time duration.

In some embodiments, the rule evaluator is configured to determine whether the identified indicator events fulfill an infection rule relating to a sequence of indicator events seen during a rule time duration. For example, the rule evaluator may determine whether or not the identified indicator events fulfill a rule requiring identification of indicator events of different types of anomaly indicators in a specific order.

In some embodiments, the rule evaluator is configured to determine whether the identified indicator events fulfill an infection rule relating to an arithmetic operation of the scores of indicator events identified in the network node during a predetermined rule duration. In some such embodiments, the rule evaluator is configured to identify whether a sum or average of scores of indicator events identified in the network node during a predetermined rule duration is above a predetermined infection threshold. In some embodiments the rule evaluator is configured to determine whether or not the result of subtraction of the scores of indicator events identified during a predetermined rule duration from an initial value is below a predetermined infection threshold.

The browsing session used to determine whether or not the network node is infected with malware may be created in any suitable way. That being said, in some embodiments the device also includes a browsing session creator configured to:

create an empty browsing session;

when the user directly accesses a specific URI, add the specific URI to the browsing session; and add to the browsing session each URI accessed through a URI already in the browsing session.

In some embodiments, the indicator event identifier comprises an internal indicator event identifier configured to identify indicator events in traffic within a Local Area Network (LAN) of which the network node forms part. In some embodiments, the indicator event identifier comprises an external indicator event identifier configured to identify indicator events in traffic between the network and IP addresses outside the network, such as, for example, within a Wide Area Network (WAN) including the network of which the network node forms part.

In some embodiments, the device is configured to identify an infected network node using inline network traffic. In some such embodiments, the device comprises a proxy through which all network traffic is directed for identification of indicator events and thereby for identification of infected network nodes. In some such embodiments, the device also includes a human user identifier configured to use at least one tool to identify whether a human user is conducting the browsing session. The at least one tool may be any suitable tool, and may be configured for one or more of identifying mouse movements, identifying suitable CPU usage patterns, or requesting that the user fulfill a Captcha challenge.

In some embodiments, the device is configured to identify an infected network node using out-of-line network traffic. In some such embodiments, the device includes a receiver configured to receive copies of the traffic sent from and received by the node, and the indicator event identifier operates on the received copies without disrupting traffic flow in the network.

Some embodiments of the invention relate to methods and devices for identifying and stopping communication traffic between a network node infected by malware and the command and control of the infecting malware, in order to prevent further infection on the network and to prevent the malware from obtaining data from the network.

According to an aspect of some embodiments of the invention there is provided a method for identifying and stopping communication traffic between a malicious URI and an infected network node, the method comprising:

obtaining a list of safe Universal Resource Identifiers (URIs) identifying safe resources;

for each communication of an infected network node with a specific URI not included in the list, sending to the infected network node a challenge requiring a specific response;

if, in response to the challenge, the infected network node provides the required specific response, allowing communication between the specific URI and the infected network node; and if the infected network node does not provide a suitable response to the challenge, identifying the specific URI as malicious and blocking all communication between the infected network node and the specific URI.

In some embodiments, blocking also comprises blocking all communication between the infected network node and any URI within a domain or website including the specific URI.

In some embodiments, the method also includes notifying other guards in the network and/or other networks of the identification of the specific resource and the specific URI as malicious.

In some embodiments, the method also includes blocking all communication of all nodes in the network with the specific URI identified as malicious and/or with any URI within a domain or website including the specific URI.

Any method of obtaining a list of safe URIs may be used for implementing the teachings herein.

In some embodiments, obtaining the list comprises generating at least part of the list of safe URIs, as described hereinabove, by:

building a browsing session based on an initial URI directly accessed by a user by:

adding the initial URI to the browsing session, and adding to the browsing session each URI accessed through a URI already in the browsing session, if the browsing session is valid, increasing a reputation score of the initial URI and all other URIs in the browsing session, and if the reputation score of the initial URI is above a threshold or if the initial URI has previously been identified as a safe URI, identifying the initial URI and all other URIs included in the browsing session as safe URIs.

In some embodiments, obtaining the list comprises generating at least part of the list of safe URIs by identifying automatically generated communications with resources that are known to be safe.

In some embodiments, the resources known to be safe are identical for multiple networks. For example, though downloading of software updates such as Microsoft® updates and the like comprises automatic browsing and not human browsing, because the origin of the software updates is known to be safe, a URI associated with this origin is included in the list of safe URIs.

In some embodiments, the resources known to be safe are specific to the network, the network node, or an organization to which the network belongs. For example, network nodes in a hospital may automatically access updates from the Center for Disease Control, which may be considered safe communication because the origin—the Center for Disease Control, is a known origin for the hospital network.

In some embodiments, obtaining the list comprises generating at least part of the list of safe URIs by including in the list URIs identified as safe URIs in other nodes in the network and/or in other networks. In some embodiments obtaining the list comprises generating at least part of the list of safe URIs by excluding from the list URIs that were identified as malicious or unsafe by another node in the network and/or by another network.

As mentioned above, a challenge requiring a specific response is sent to the infected network node prior to communicating with a URI for the first time in a new connection, if the URI is not included in the safe list at the time of first communication therewith. The challenge may require any suitable response, and typically requires a response which is indicative a human browsing at the infected network node. In some embodiments, the challenge may include an HTTP status code 302 redirecting to the specific URI and requires specific browser operations as a response. In some embodiments, the challenge requires adding one or more cookies as the response. In some embodiments, the challenge comprises a Captcha challenge. In some embodiments the challenge requires running of a program or script, such as a javascript code segment, on the node to calculate a value, and providing the calculated value as the response.

In some embodiments, the method for identifying and stopping communication traffic between a malicious URI or resource and an infected network node is carried out inline. In some such embodiments, the method includes directing all communication traffic through a proxy, such that sending the challenge, receiving the response to the challenge, and blocking communication with the specific URI is carried out by the proxy.

In some embodiments, the method for identifying and stopping communication traffic between a malicious URI or resource and an infected network node is carried out out-of-line. In some such embodiments, the method comprises a controlling node in the network spoofing a reply from a web server associated with the specific URI to the infected network node thereby to send the challenge to the infected network node.

In such embodiments, the response from the infected node is received by the controlling node. If the response does not correspond to the required response, this is indicative of the browsing being carried out by the malware trying to communicate with its command and control, and thus the specific URI and resource are identified as malicious. In such embodiments, blocking is carried out in any suitable way such as by using a firewall to block communication with the malicious URI, using the firewall to block all communication exiting from the infected network node, or by sending TCP resets to the infected network node.

The method for identifying and stopping communication traffic between a malicious URI or resource and an infected network node can be carried out using any suitable device. That being said, according to an aspect of some embodiments of the invention there is also provided a device for identifying and stopping communication traffic between a malicious URI and an infected network node, the device comprising:

a safe list obtainer configured to obtain a list of safe Universal Resource Identifiers (URIs) identifying safe resources;

a requestor configured, for each communication of an infected network node with a specific URI not included in the list, to send to the infected network node a challenge requiring a specific response;

a response evaluator, configured:
 if, in response to the challenge, the infected network node provides the required specific response, to allow communication between the specific URI and the infected network node; and
 if the infected network node does not provide a suitable response to the challenge, to identify the specific URI as malicious and to block all communication between the infected network node and the specific URI.

In some embodiments, the response evaluator is configured to block all communication between the infected network node and any URI within a domain or website including the specific URI.

In some embodiments, the response evaluator is configured to block only communication between the infected network node and the specific malicious URI.

In some embodiments, the response evaluator is also configured to notify other guards in the network and/or other networks of the identification of the specific URI as malicious.

In some embodiments, the device is also configured to block all communication of all nodes in the network with the specific URI identified as malicious and/or with any URI within a domain or website including the specific URI.

The safe list obtainer may obtain the list of safe URIs using any suitable method.

In some embodiments, the safe list obtainer is configured to obtain at least part of the list of safe URIs, as described hereinabove, by:
 building a browsing session based on an initial URI directly accessed by a user by:
  adding the initial URI to the browsing session, and
  adding to the browsing session each URI accessed through a URI already in the browsing session,
 if the browsing session is valid, increasing a reputation score of the initial URI and all other URIs in the browsing session, and
 if the reputation score of the initial URI is above a threshold or if the initial URI has previously been identified as a safe URI, identifying the initial URI and all other URIs included in the browsing session as safe URIs.

In some embodiments, the safe list obtainer is configured to obtain at least part of the list of safe URIs by identifying automatically generated communications with resources that are known to be safe.

In some embodiments, the resources known to be safe are identical for multiple networks. For example, though downloading of software updates such as Microsoft® updates and the like comprises automatic browsing and not human browsing, because the origin of the software updates is known to be safe, a URI associated with this origin is included in the list of safe URIs.

In some embodiments, the resources known to be safe are specific to the network, the network node, or an organization to which the network belongs. For example, network nodes in a hospital may automatically access updates from the Center for Disease Control, which may be considered safe communication because the origin—the Center for Disease Control, is a known origin for the hospital network.

In some embodiments, the safe list obtainer is configured to obtain at least part of the list of safe URIs by including in the list URIs identified as safe URIs in other nodes in the network and/or in other networks. In some embodiments the safe list obtainer is configured to obtain at least part of the list of safe URIs by excluding from the list URIs that were identified as malicious or unsafe by another node in the network and/or by another network.

As mentioned above, the requestor is configured to send to the infected network node a challenge requiring a specific response prior to communication of the infected network node with a specific URI for the first time in a new connection, if the specific URI is not included in the safe list at the time of first communication therewith. The challenge may require any suitable response, and typically requires a response which is indicative a human browsing at the infected network node. In some embodiments, the requestor is configured to send a challenge including an HTTP status code 302 redirecting to the specific URI and requiring as a response specific browser operations. In some embodiments, the requestor is configured to send a challenge requiring adding one or more cookies as the response. In some embodiments, the requestor is configured to send a Captcha challenge. In some embodiments the requestor is configured to send a challenge requiring running of a program or script, such as a javascript code segment, on the node to calculate a value, and providing the calculated value as the response.

In some embodiments, at least two of the safe list obtainer, the requestor and the response evaluator may comprise a single component. In some embodiments, all of the safe list obtainer, the requestor and the response evaluator comprise a single component.

In some embodiments, the device comprises a proxy configured to identify and to stop communication traffic between the infected network node and the malicious URI inline.

In some embodiments, the device comprises a controlling node configured to identify and stop communication traffic between the infected network node and the malicious URI out-of-line. In some such embodiments, the requestor is configured to spoof a reply from a web server associated with the specific URI to the infected network node, thereby to send the challenge to the infected network node. The controlling node is configured to sniff the response to the challenge. If the response does not correspond to the required response, this is indicative of the browsing being carried out by the malware trying to communicate with its command and control, and thus the specific URI and resource are identified as malicious.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

Embodiments of methods and/or devices of the invention may involve performing or completing selected tasks manually, automatically, or a combination thereof. Some embodiments of the invention are implemented with the use of components that comprise hardware, software, firmware or combinations thereof. In some embodiments, some components are general-purpose components such as general purpose computers or monitors.

In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a non-volatile storage, for example, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results).

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1:
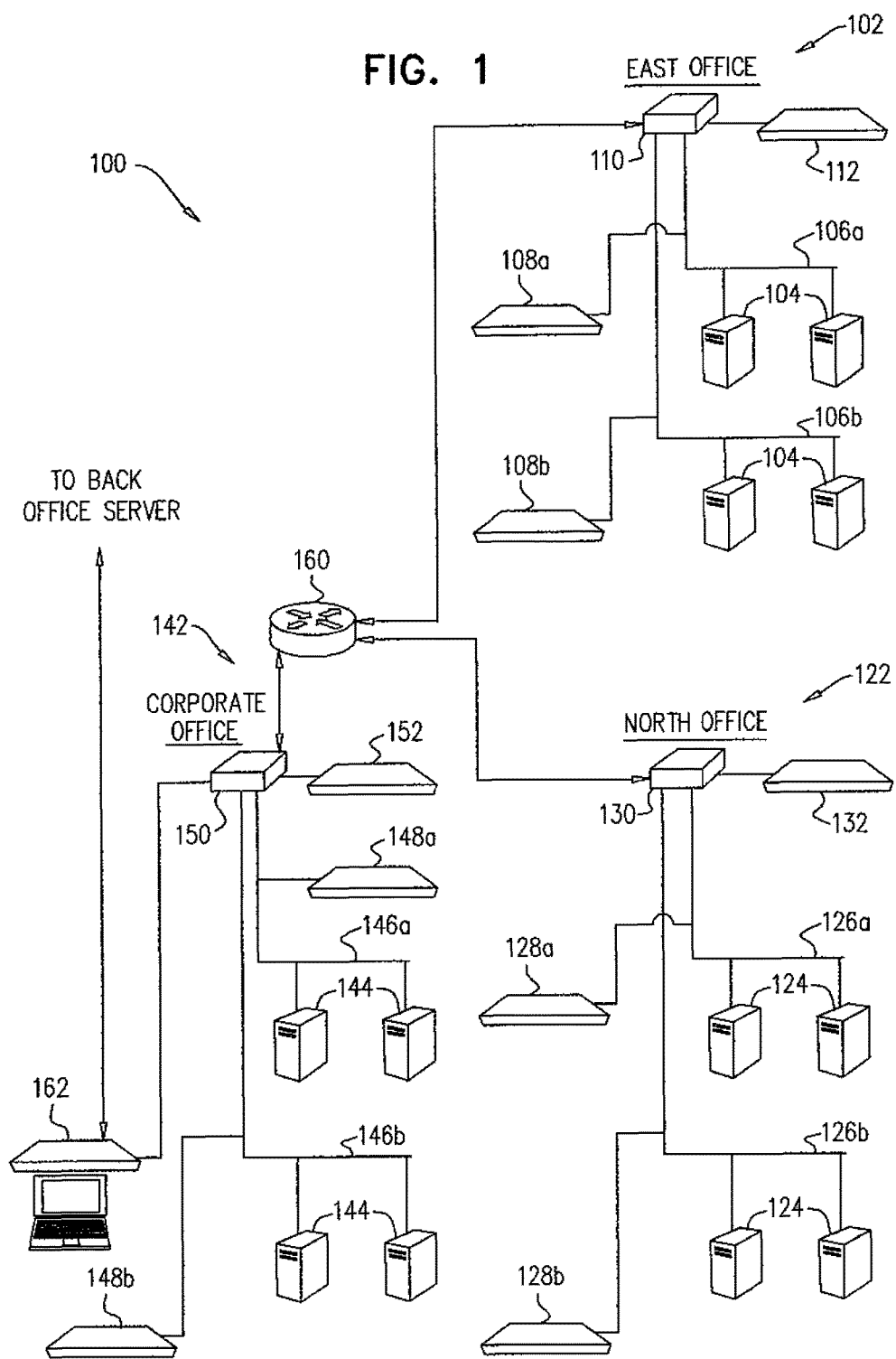
FIG. 1 is a simplified graphic representation of an embodiment of a network for use with methods and devices in accordance with the teachings herein.

The invention, in some embodiments, relates to the field of computer threats, and more specifically to identifying the presence of advanced persistent threats, or malware, on a computer network node.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

Some aspects of the invention herein relate to methods and devices for identifying safe URIs and resources in a network (whitelisting resources).

Thus, according to an aspect of some embodiments of the invention there is provided a method for identifying safe URIs, the method comprising:

each time a browser of a node in a network directly accesses a specific Uniform Resource Identifier (URI), building a browsing session based on the specific URI by:
adding the specific URI to the browsing session; and
adding to the browsing session each URI accessed through a URI already in the browsing session;
if the browsing session is valid, increasing a reputation score of the specific URI and of all other URIs in the browsing session; and
if the reputation score of the specific URI is above a threshold or if the specific URI has previously been identified as a safe URI, identifying the specific URI and all other URIs included in the browsing session as safe URIs.

According to an aspect of some embodiments of the invention there is also provided a device for identifying safe URIs, the device comprising:

a direct access identifier configured to identify when a browser of a node in a network directly accesses a specific Uniform Resource Identifier (URI);
a browsing session builder functionally associated with the direct access identifier and configured, following identification of direct access to the specific URI, to build a browsing session based on the specific URI by:
adding the specific URI to the browsing session; and
adding to the browsing session each URI accessed through a URI already in the browsing session;
a browsing session validator configured to identify whether or not the browsing session is valid, and if the browsing session is valid to increase a reputation score of the specific URI and of all other URIs in the browsing session; and
a safe resource identifier functionally associated with the browsing session validator and configured to identify the specific URI and all other URIs included in the browsing session as safe URIs if the reputation score of the specific URI is above a threshold or if the specific URI has previously been identified as a safe URI.

Some aspects of the invention herein relate to methods and devices for identifying whether or not a network node is infected by malware.

Thus, according to an aspect of some embodiments of the invention there is provided a method for identifying whether a network node is infected by malware, the method comprising:

identifying indicator events for each of a plurality of anomaly indicators, by:
counting a number of occurrences of an anomaly indicator in at least one of a network node and a network during a predetermined time duration; and
if the number of occurrences of the anomaly indicator during the predetermined time duration is greater than a predetermined event threshold, identifying an indicator event associated with the anomaly indicator during the predetermined time duration and assigning an expiration duration to the indicator event;
determining whether non-expired identified indicator events fulfill at least one predetermined infection rule; and
if the identified indicator events fulfill at least one the predetermined infection rule, identifying the network node as infected by malware.

According to an aspect of some embodiments of the invention there is also provided a device for identifying whether a network node is infected by malware, the device comprising:

an indicator event identifier, configured to identify indicator events for each of a plurality of anomaly indicators, by:
counting a number of occurrences of an anomaly indicator in at least one of a network node and a network during a predetermined time duration; and
if the number of occurrences of the anomaly indicator during the predetermined time duration is greater than a predetermined event threshold, identifying an indicator event associated with the anomaly indicator during the predetermined time duration and assigning an expiration duration to the identified indicator event;
a rule evaluator functionally associated with the indicator event identifier and configured to determine whether non-expired indicator events identified by the indicator event identifier fulfill at least one predetermined infection rule; and
an infection identifier functionally associated with the rule evaluator and configured to identify the network node as infected by malware if the rule evaluator determined that the identified indicator events fulfill the at least one predetermined infection rule.

Some embodiments of the invention herein relate to methods and devices for identifying and stopping communication traffic between an infected network node a malicious resource, in order to prevent further infection on the network and to prevent the malware from obtaining the data it is seeking.

According to an aspect of some embodiments of the invention there is provided a method for identifying and stopping communication traffic between a malicious URI and an infected network node, the method comprising:

obtaining a list of safe Universal Resource Identifiers (URIs) identifying safe resources;
for each communication of an infected network node with a specific URI not included in the list, sending to the infected network node a challenge requiring a specific response;
if, in response to the challenge, the infected network node provides the required specific response, allowing communication between the specific URI and the infected network node; and
if the infected network node does not provide a suitable response to the challenge, identifying the specific URI as malicious and blocking all communication between the infected network node and the specific URI.

According to an aspect of some embodiments of the invention there is also provided a device for identifying and stopping communication traffic between a malicious URI and an infected network node, the device comprising:

a safe list obtainer configured to obtain a list of safe Universal Resource Identifiers (URIs) identifying safe resources;

a requestor configured, for each communication of an infected network node with a specific URI not included in the list, to send to the infected network node a challenge requiring a specific response; and a response evaluator, configured:

if, in response to the challenge, the infected network node provides the required specific response, to allow communication between the specific URI and the infected network node; and if the infected network node does not provide a suitable response to the challenge, to identify the specific URI as malicious and to block all communication between the infected network node and the specific URI.

Reference is now made to FIG. 1, which is a simplified graphic representation of an embodiment of an exemplary network 100 for use with methods and devices in accordance with the teachings herein.

It is appreciated that the network illustrated in FIG. 1 is merely an example of one of many types of networks which may be used with the methods and devices described hereinbelow with reference to FIGS. 2-7.

As seen in FIG. 1, a network 100, forming part of an organization such as an office, a bank, or the like, includes a plurality of office networks, here illustrated as three networks, namely east office 102, north office 122, and corporate office 142. Each of offices 102, 122, and 142 includes a plurality of nodes indicated by reference numerals 104, 124, and 144 respectively. The network nodes within each of the offices are connected by one or more Local Area Networks (LANs). For example, in the illustrated embodiment nodes 104 of east office 102 are connected to one another by two LANs 106a and 106b, nodes 124 of north office 122 are connected to one another by two LANs 126a and 126b, and nodes 144 of corporate office 142 are connected to one another by two LANs 146a and 146b.

In each of offices 102, 122, and 142, each of the LANs is connected to an internal guard, configured to monitor traffic within the LAN in order to identify infection of the network nodes by malware and/or to identify malicious traffic in the LAN, as will be described hereinbelow. In the illustrated embodiment, LANs 106a and 106b are associated with internal guards 108a and 108b, respectively, LANs 126a and 126b are associated with internal guards 128a and 128b, respectively, and LANs 146a and 146b are associated with internal guards 148a and 148b, respectively.

The LANs of each of the offices 102, 122, and 124 are connected to a dedicated switch, such that LANs 106a and 106b are connected to a switch 110, LANs 126a and 126b are connected to a switch 130, and LANs 146a and 146b are connected to a switch 150. Each of switches 110, 130 and 150 has associated therewith an external guard, indicated by reference numerals 112, 132, and 152, respectively. External guards 112, 132, and 152 are configured to monitor traffic between the office switches 110, 130, and 150 and the Internet or any other Wide Area Network (WAN) to which the switches connect. Thus, the external guards monitor all the traffic between each of offices 102, 122, and 124 and external networks to which the offices connect in order to identify, or assist in identifying, infection of one of the nodes in the respective office by malware and/or to identify malicious traffic entering or exiting the respective switch and office as described in further detail hereinbelow.

The methods described hereinbelow with reference to FIGS. 3, 5, and 7, or, in other terms, the logical analysis of traffic in the network, is carried out by the internal and external guards.

The switches 110, 130, and 150, and thus the offices 102, 122, and 142, communicate with one another via a router 160.

Switch 150 of corporate office 142 is also connected to a manager node 162, and manager node 162 is configured to communicate with data collection servers (not shown), which servers do not form part of the organization network 100 but rather collect data from many such networks. The manager 162 is configured to communicate with internal guards 108, 128 and 148 and with external guards 112, 132, and 152 via switches 110, 130 and 150 and via router 160. In some embodiments, manager node 162 shares information, such as identification of safe URIs, identification of malicious URIs and the like, with the internal and external guards. In some embodiments, the internal and external guards convey to manager node 162 information regarding nodes in their network which are identified as infected, for example as described hereinbelow with reference to FIG. 5, and about URIs identified as malicious, for example as described hereinbelow with reference to FIG. 7.

Manager node 162 communicates with the data collection servers and receives from them updates which are relevant to maintenance of security in the network, such as updates regarding URIs which have been identified, for example in another network, as malicious, URIs that have been identified, for example in another network, as safe, and solutions for removing malware infections, for example ones identified in another network or newly developed solutions. The information received from the data collection servers is transmitted from manager node 162 to the external and internal guards as described hereinabove. Manager node 162 additionally transmits to the data collection servers information about malware infections identified in network 100, and about URIs found to be malicious or safe.

Manager node 162 is also configured to function as an interface with a user, such as an IT manager or security officer, for configuring the network and in particular the internal and external guards. For example, the user may access manager node 162 in order to see which nodes in network 100 were identified as infected by malware, or to inspect forensic and diagnostic information regarding the network or the sub-networks of any of offices 102, 122, and 142.

Figure 2:
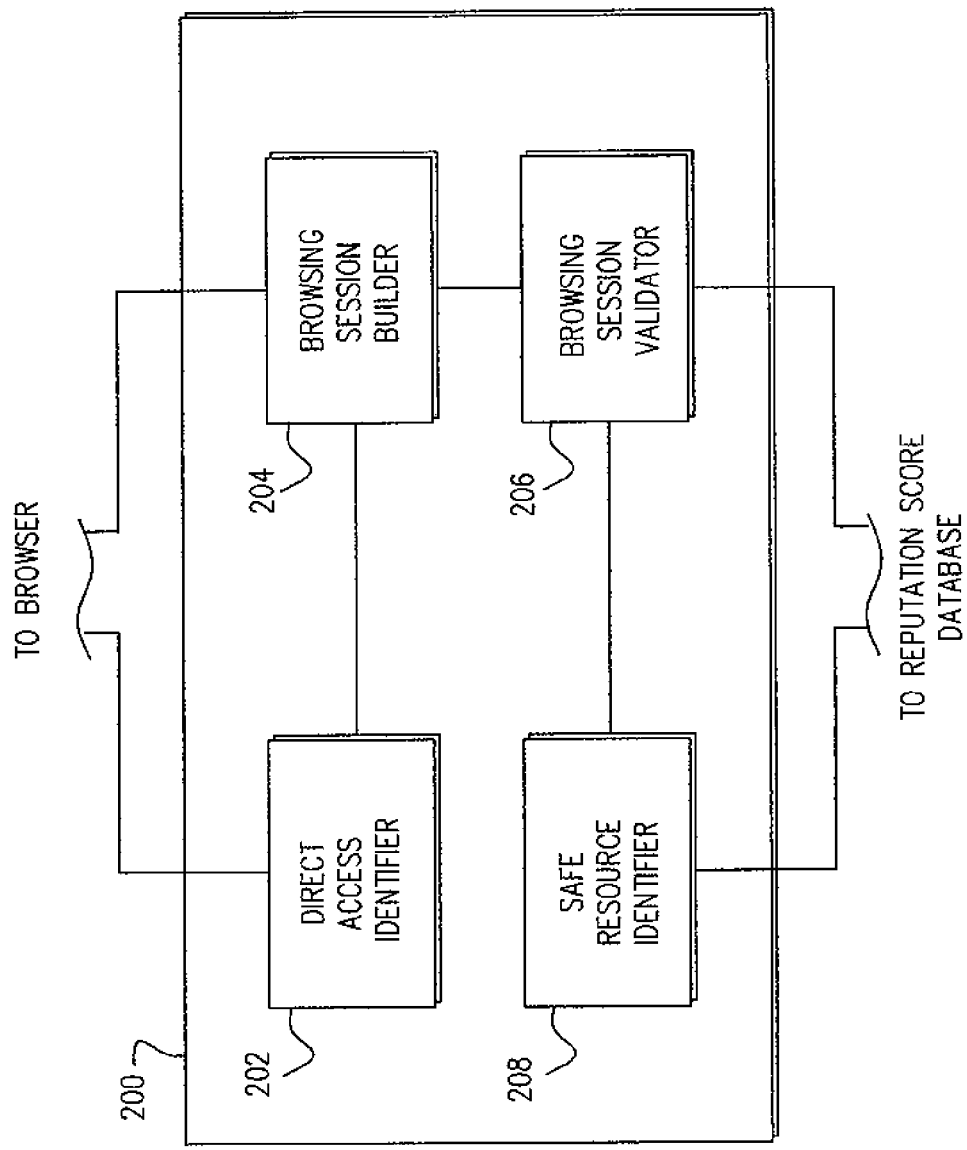
FIG. 2 is a block diagram of an embodiment of a device for identifying safe URIs in accordance with an embodiment of the teachings herein.
Figure 3:
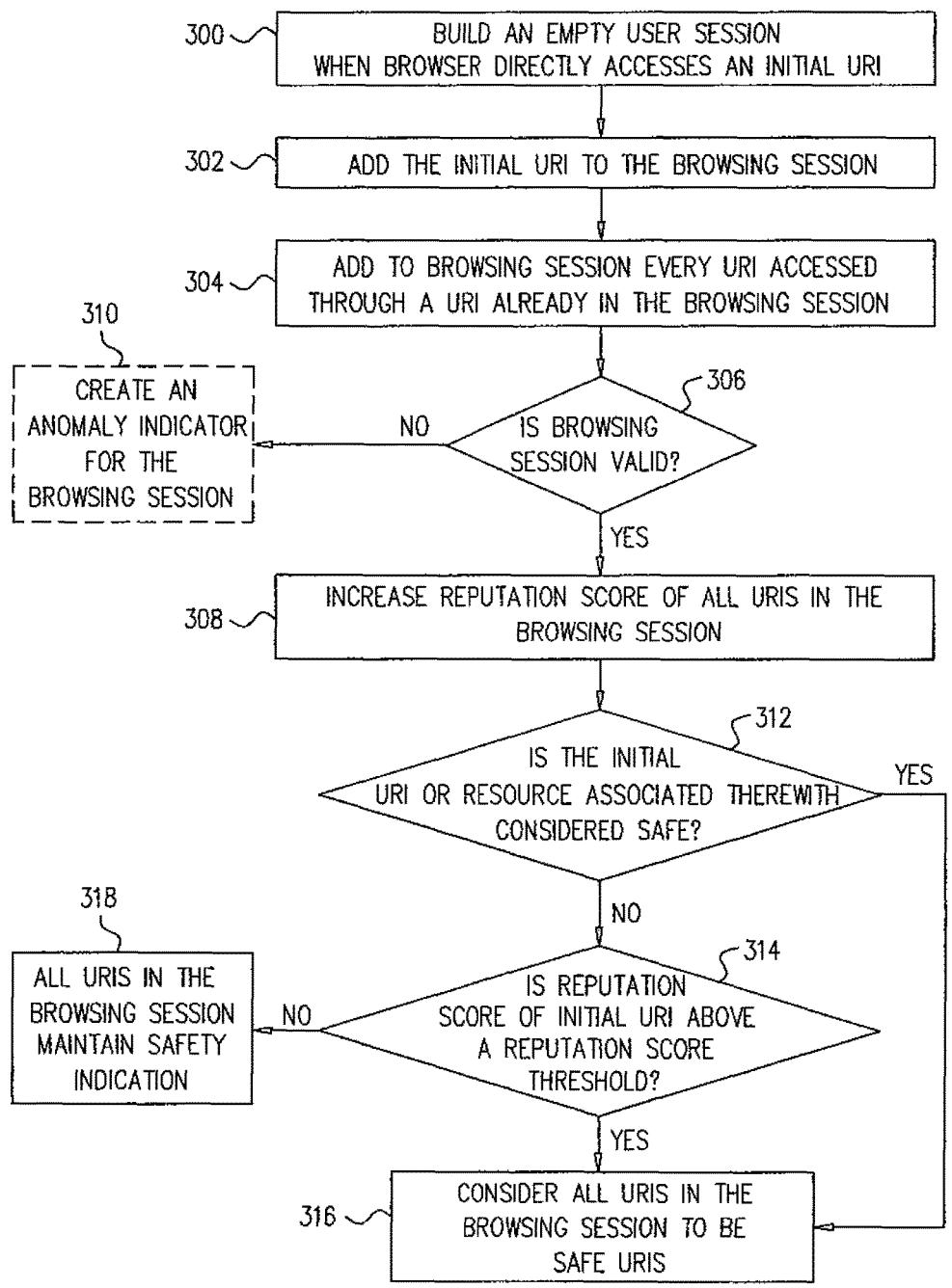
FIG. 3 is a flow chart of an embodiment of a method for identifying safe URIs in accordance with an embodiment of the teachings herein.

Reference is now made to FIG. 2, which is a block diagram of an embodiment of a device 200 for identifying safe URIs in accordance with an embodiment of the teachings herein, and to FIG. 3, which is a flow chart of an embodiment of a method for identifying safe URIs in accordance with an embodiment of the teachings herein.

Device 200 illustrated in block diagram form in FIG. 2 is an embodiment of a device configured to carry out the logic of the process illustrated in the flow chart of FIG. 3. Device 200 may form part of the processor of a node for monitoring traffic in a network, such as internal guards 106, 126, or 146 or external guards 112, 132, or 152 of FIG. 1.

As seen in FIG. 2, device 200 includes a direct access identifier 202 functionally associated with a browser (not shown), and a browsing session builder 204 functionally associated with the browser and with direct access identifier 202. Direct access identifier 202 monitors requests sent from the browser, and identifies, for each such request, whether the request was formed by direct access of a user to the requested URI or whether the request was formed by a referring URI.

In some embodiments, direct access identifier 202 identifies direct access to a URI by identifying that a request for the URI includes a blank value in the request referrer field, not in the context of an existing browsing session.

When direct access identifier 202 identifies that the browser has directly accessed the URI, also termed the initial URI, browsing session builder 204 builds an empty browsing session, as seen at step 300 in FIG. 3, and adds the initial URI to the browsing session, as seen at step 302 in FIG. 3.

The initial URI may be a URI for any suitable resource, including web pages, text documents, images, sound files, multimedia files, executable files, Web services, or for any other resource that can be accessed through a web site or any web interface technology.

Browsing session builder 204 continues to monitor the requests issued by the browser, and adds to the browsing session any new URI accessed through an existing URI already in the browsing session, as seen at step 304 in FIG. 3. In some embodiments, browsing session builder 204 identifies that a new URI is accessed through an existing URI already in the browsing session if the existing URI is provided as the value of the referrer field of the request for the new URI. In some embodiments, browsing session builder 204 checks that the new URI has a specific combination of headers before adding the URI to the browsing session.

In accordance with the teachings herein, each URI has associated therewith a reputation score, such that a high reputation score is indicative of a low chance of the URI being malicious. In some embodiments, the reputation score is stored in a database functionally associated with the network, and more specifically with the manager node of the network, such as node 162 of FIG. 1, or with the router of the network, such as router 160 of FIG. 1, so that all guards in the network can obtain and/or can update the reputation score for a specific URI.

A browsing session validator 206, functionally associated with browsing session builder 204 and having a communication channel with a reputation score database (not shown), is configured to identify whether or not the browsing session created by browsing session builder 204 is valid, at step 306 of FIG. 3. In some embodiments, the browsing session is considered to be valid if no anomaly indicator was identified during addition of URIs to the browsing session or following addition of URIs to the browsing session prior to the validation, and/or if no blacklisted URI was accessed during the browsing session. Types of anomaly indicators and methods for identifying anomaly indicators are described hereinbelow with reference to FIGS. 4 and 5. In some embodiments, browsing session validator 206 identifies the browsing session as being invalid if a request for a URI in the browsing session includes a value in the request referrer field that does not match any URI currently in the browsing session.

If the browsing session validator 206 determines that the browsing session is valid, it increases the reputation score of all URIs in the browsing session (by communicating the updates scores to the reputation score database) as seen at step 308 of FIG. 3.

In some embodiments, as seen at step 310 of FIG. 3, if the browsing session is not valid, an anomaly indicator is created for the browsing session, which anomaly indicator can be used to determine whether or not the network node is infected with malware, as described hereinbelow with reference to FIGS. 4 and 5.

A safe resource identifier 208 functionally associated with browsing session validator 206 and/or in communication with the reputation score database checks whether or not the initial URI and/or the resource associated therewith are considered safe, at step 312 of FIG. 3. If the initial URI and resource are not considered safe (but there is no indication of the initial URI or resource being malicious), safe resource identifier 208 obtains the reputation score for the initial URI and checks whether the obtained reputation score is above a predetermined reputation score threshold, at step 314 of FIG. 3.

If the initial URI is considered safe, and/or if the reputation score of the initial URI is above the predetermined reputation score threshold, safe resource identifier 208 indicates that all URIs in the browsing session are considered to relate to safe resources, as seen at step 316 of FIG. 3. In some embodiments, safe resource identifier 208 also adds all the URIs in the browsing session to a white list of safe URIs.

In some embodiments, if the initial URI is not considered safe and is of unknown safety, and the reputation score of the initial URI does not exceed the reputation score threshold, all URIs in the browsing session maintain their previous safety indication, at step 318 of FIG. 3. In other words, any URI in the browsing session that was previously considered safe continues to be considered safe, and any URI in the browsing session that was previously uncategorized as safe or unsafe remains uncategorized.

In some embodiment, the reputation score of a URI is aggregated for all nodes and users of the network. In some embodiments, the reputation score of a URI is aggregated for all nodes and users in a number of networks that communicate with one another. For example, the reputation score of a URI may be aggregated for all nodes and users in a plurality of government offices, all of which communicate with one another through a government WAN.

In the context of the teachings herein, a safe URI is a URI which identifies a safe resource. In some embodiments, a safe resource is a resource which does not contain, generate, or infect the network node with malware. In some embodiments, a safe resource is a resource that, when accessed, does not attempt to communicate with an infected network node by sending or receiving malicious data and/or commands.

It is appreciated that though direct access identifier 202, browsing session builder 204, browsing session validator 206 and safe resource identifier 208 are illustrated as separate components, any two or more of them may be implemented in a single component or in a single logical circuit.

Figure 4:
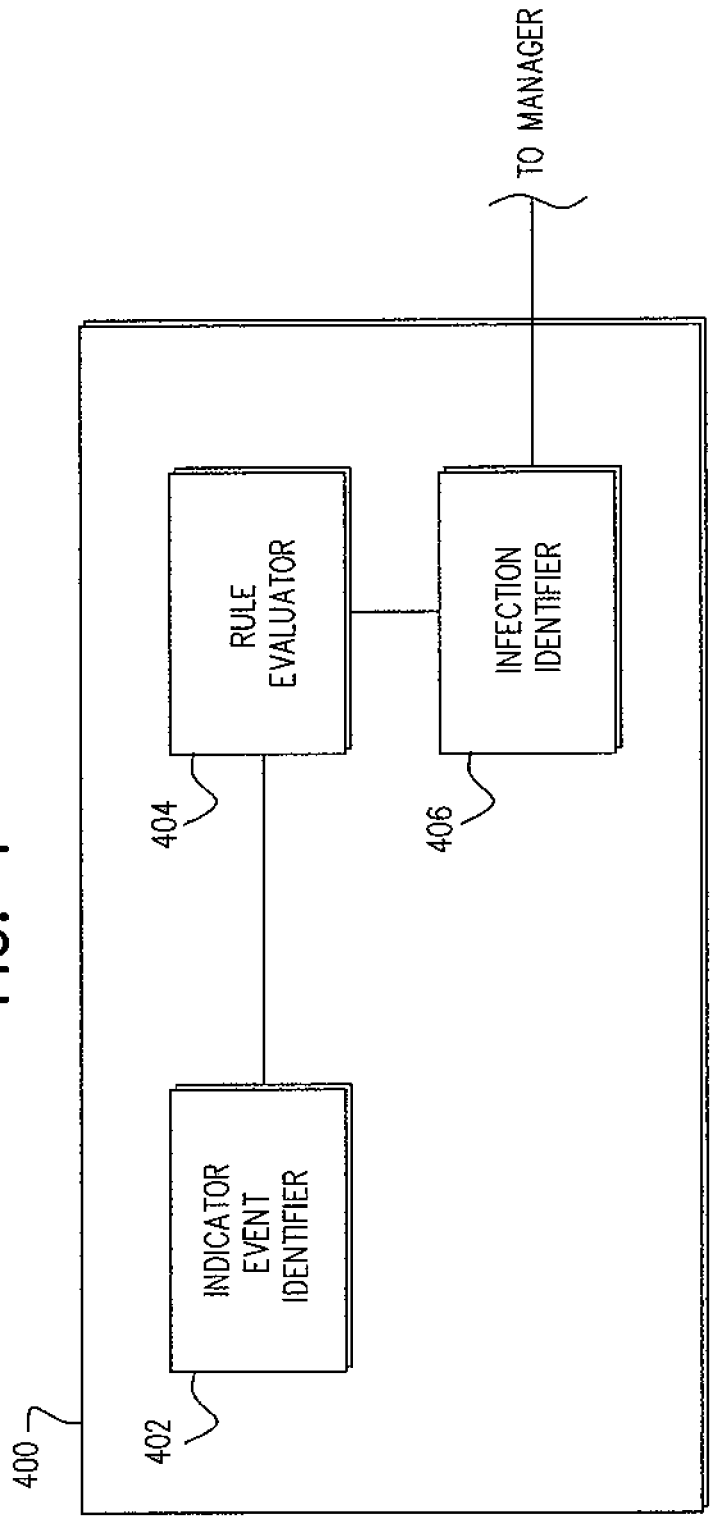
FIG. 4 is a block diagram of an embodiment of a device for identifying whether a network node is infected by malware in accordance with an embodiment of the teachings herein.
Figure 5:
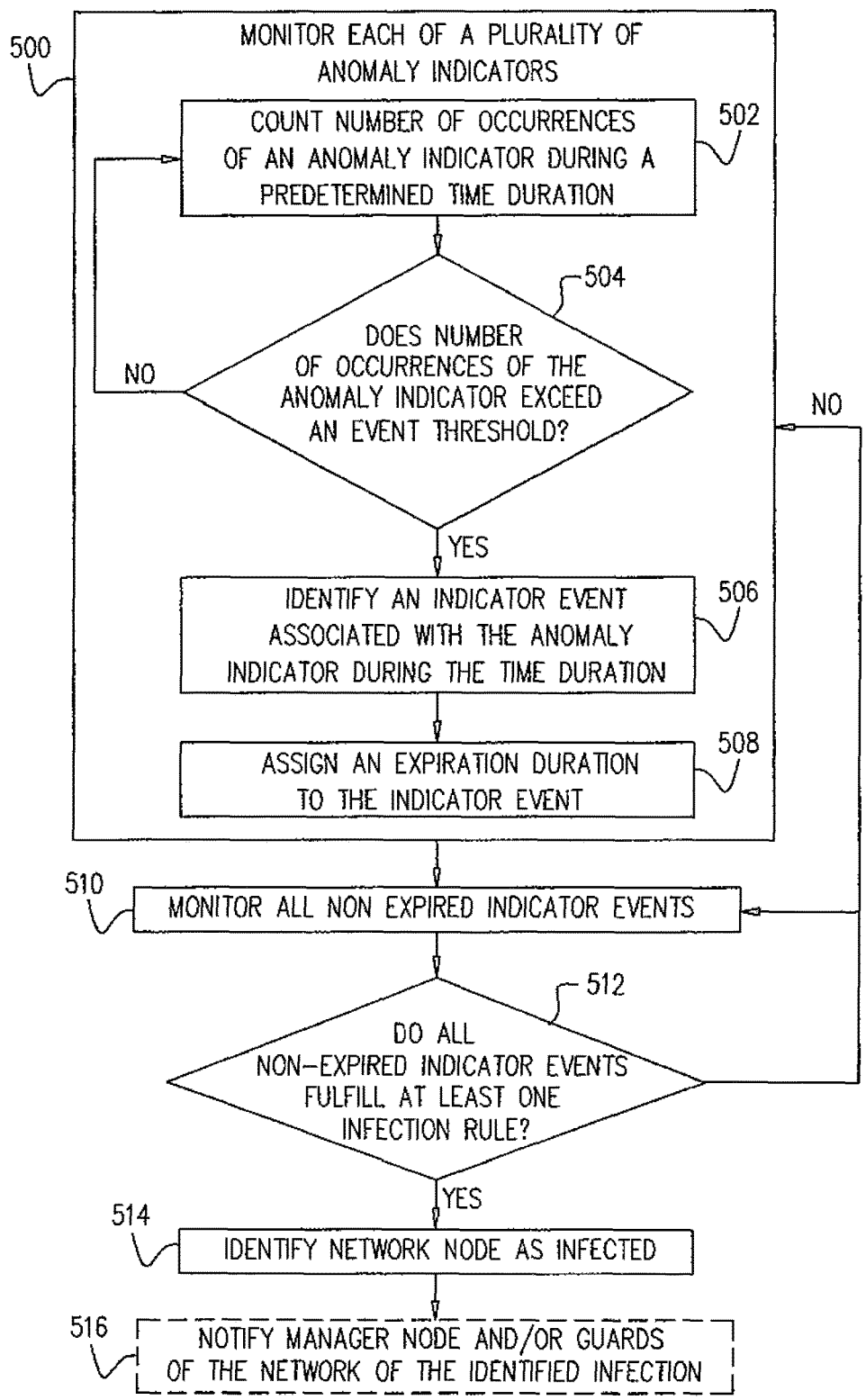
FIG. 5 is a flow chart of an embodiment of a method for identifying whether a network node is infected by malware in accordance with an embodiment of the teachings herein.

Reference is now made to FIG. 4, which is a block diagram of an embodiment of a device 400 for identifying whether a network node is infected by malware in accordance with an embodiment of the teachings herein, and to FIG. 5, which is a flow chart of an embodiment of a method for identifying whether a network node is infected by malware in accordance with an embodiment of the teachings herein.

Device 400 illustrated in block diagram form in FIG. 4 is an embodiment of a device configured to carry out the logic of the process illustrated in the flow chart of FIG. 5. Device 400 may form part of the processor of a node for monitoring traffic in a network, such as internal guards 106, 126, or 146 or external guards 112, 132, or 152 of FIG. 1.

As seen in FIG. 4, device 400 includes an indicator event identifier 402, which is configured identify indicator events for each of a plurality of anomaly indicators. As will be explained in greater detail hereinbelow, various characteristics of the traffic coming in and out of a network and in and out of a node in the network may be indicative of infection of the node. Such characteristics are termed anomaly indicators herein.

Some anomaly indicators are global anomaly indicators, which, when found, are relevant to all nodes of the network or even to other networks. For example, if a specific web page is identified as malware or as a malware command and control element, all traffic monitoring nodes, such as internal and external guards, are notified of the nature of the web page, and any access to the specific web page, from any the node in the network, is considered an anomaly indicator.

Some anomaly indicators are local anomaly indicators, which are specific to the network node in which they were identified and/or to the browsing session in which they were identified.

Anomaly indicators may be based on any type of traffic in the network and/or on any protocol running in the network, including HTTP, FTP, DNS, IRC, and the like.

One exemplary anomaly indicator is URI access out of context of a browsing session of the network node. Typically, every access to a URI other than an initial URI of a browsing session (as described hereinabove) is in the context of a browsing session, as described hereinabove with reference to FIGS. 2 and 3. For each access to a URI within a browsing session, the referrer field of the request should include a value indicating a URI in the browsing session. Thus, an HTTP request in which the referrer field does not include a URI already in the browsing session is considered to be out of context and may generate an anomaly indicator occurrence.

Another exemplary anomaly indicator relates to the structure of a resource being accessed. All resources are expected to have a common, known, minimum structure or profile. For example, a common web page is expected to have a title, a few images, and a few scripts. Absence of some or all of the expected elements or attributes in a web page or other resource being accessed is abnormal and may be considered an anomaly indicator. In some embodiments, the severity of the anomaly, which may affect a score given to the anomaly indicator, depends on the number of expected elements, or attributes, which are absent from the accessed resource.

As another example, each access to an IP address over the Internet is expected to trigger a corresponding DNS query. The absence of such a DNS query may be considered an anomaly indicator.

As an additional example, an anomaly indicator may be related to a number of TCP connections opened during a browsing session. In typical use, a specific number of TCP connections is expected to be opened during the lifespan of each browsing session, depending on the type of browser used and on other characteristics of the network. Opening of a smaller or greater number of TCP connections during the browsing session may be indicative of access of malware to a command and control entity, and is therefore considered an anomaly indicator.

Another exemplary anomaly indicator relates to the user agent attribute of an HTTP request in a browsing session. For example, all HTTP requests in a given browsing session are expected to have the same value in the "User Agent" header of the request. An HTTP request having a different value in the "User Agent" header is often a request which did not originate from the browser but from another tool or source, such as from malware. Therefore, identification of an HTTP request having a different "User Agent" value than all other requests in the browsing session may be considered an anomaly indicator.

An additional exemplary anomaly indicator relates to the type of traffic passing through a single TCP connection. For example, a TCP connection is expected to carry only HTTP traffic. Identification of non HTTP traffic, such as a stream of data, passing through a TCP connection, may be indicative of a TCP connection to a malware command and control entity which would know how to parse the stream of data, and thus may be considered an anomaly indicator.

Another exemplary anomaly indicator relates to the longevity of domains accessed during the browsing session. Most well established web resources, which are clearly considered safe, have the same IP address and exist for a long time, such as several months or years. By contrast, the command and control of malware is usually generated for the purpose of infecting nodes with malware, and does not have any type of longevity of the IP address. Thus, access of a node to one or more domains having a short lifetime can be considered indicative of access to a malware command and control entity and may thus be considered an anomaly indicator. The longevity of a URI being accessed by a node may be determined, for example, by keeping a history of DNS records or by consulting with DNS authorities.

Further exemplary anomaly indicators relate to aspects of a specific HTTP response in the browsing session or all HTTP responses in the browsing session or to characteristics of the browsing session. Such anomaly indicators may include anomaly indicators relating to the HTML content of an HTTP response in the browsing session, anomaly indicators relating to the HTML tags of an HTTP response in the browsing session, anomaly indicators relating to the HTML content of all HTTP responses in the browsing session, anomaly indicators relating to the HTML tags of all HTTP responses in the browsing session, and anomaly indicators relating to the length of the browsing session. Generally, any attribute or characteristic of one or more HTTP requests or responses in the browsing session may be used to define an anomaly indicator suitable for use with the methods and devices described herein.

As seen at step 500 of FIG. 5, indicator event identifier 402 monitors the network node and/or the network for various types of anomaly indicators. For each specific type of anomaly indicator, the indicator event identifier 402 counts the number of occurrences of an anomaly indicator of that type occurring within a predetermined time duration, at step 502 of FIG. 5.

At step 504 in FIG. 5, indicator event identifier 402 checks whether the number of occurrences of the specific anomaly indicator type identified in the predetermined time duration exceeds an event threshold. If the event threshold is not exceeded, indicator event identifier 402 continues to monitor the node for anomaly indicators and continues to count the number of occurrences of anomaly indicators seen.

As seen at step 506 of FIG. 5, if the event threshold is exceeded, indicator event identifier 402 identifies an event of the specific anomaly type occurring in the network node during the predetermined time duration. Indicator event identifier 402 assigns an expiration duration to the identified event at step 508. The expiration duration indicates how long the indicator event is considered valid and may affect the determination whether or not the node is infected by malware.

Each of the predetermined time duration and the event threshold may be the same for all anomaly indicator types, or may be specific to different anomaly indicator types.

Similarly, each of the predetermined time duration and the event threshold may be the same for all nodes in a network, or may be specific to each specific node in the network.

The expiration duration may be the same for all events of all anomaly indicator types, may be specific to all events of a given anomaly indicator type, or may be specific to the event itself.

The indicator events identified by indicator event identifier 402 may be indicator events identified in traffic within a Local Area Network (LAN) of which the network node forms part, or may be indicator events identified in traffic between the network and IP addresses outside the network, such as, for example, within a Wide Area Network (WAN) including the network of which the network node forms part. As such, in some embodiments, indicator event identifier 402 comprises a LAN component, such as a component forming part of an internal guard as shown in FIG. 1, and in some embodiments indicator event identifier 402 comprises a WAN component, such as a component forming part of an external guard as shown in FIG. 1.

A rule evaluator 404, functionally associated with the indicator event identifier 402, monitors all non-expired indicator events of all anomaly indicator types associated with the network node, at step 510 of FIG. 5. The rule evaluator 404 continuously or periodically checks whether the non-expired indicator events associated with the network node fulfill one or more infection rules, at step 512 of FIG. 5. In the context of the teachings herein, an infection rule is any rule that, when fulfilled, is indicative of a network node being infected by malware.

If no infection rule is fulfilled, the indicator event identifier 402 and the rule evaluator 404 continue to monitor the network for additional indicator events and for indicator events that fulfill an infection rule.

If, on the other hand, rule evaluator 404 identifies that one or more infection rules are fulfilled by the non-expired indicator events associated with the node, rule evaluator 404 provides information regarding the fulfilled infection rule and the indicator events fulfilling the rule to an infection identifier 406. Infection identifier 406 is functionally associated with rule evaluator 404 and is in communication with other portions of the network, such as with a network manager such as manager node 162 of FIG. 1 or with network communication guards such as the internal and external guards of FIG. 1. Based on the information provided by rule evaluator 404, infection identifier 406 identifies the network node as infected by malware at step 514, and may notify the manager node and/or relevant network guards of such infection as seen at step 516 of FIG. 5.

The infection rules evaluated by rule evaluator 404 may be any suitable rules relating to the indicator events.

In some embodiments, at least one of the infection rules relates to a set of indicator events seen during a rule time duration. For example, the rule may state that seeing at least one indicator event of each of three different, and, in some embodiments, specific, types of anomaly indicators is indicative of an infected network node. As another example, the rule may state that seeing at least two local, or browsing session specific, indicator events of two different types of anomaly indicators, as well as at least two global, or network general, indicator events, is indicative of an infected network node.

In some embodiments, at least one of the infection rules relates to a sequence of indicator events seen during a rule time duration. Specifically, the rule may define a particular order of indicator events of different types of anomaly indicators, which is indicative of an infected node. For example, the rule may specify that the network node should be considered infected if an out of context URI access is identified, followed by identification of an IP access lacking a corresponding DNS query and by identification of a different "User Agent" header.

In some embodiments, at least one of the infection rules relates to a score or weight of identified indicator events. In some such embodiments, when an indicator event is identified by indicator event identifier 402, the indicator event is assigned a score.

In such embodiments, the rule comprises a rule relating to an arithmetic operation of the scores of indicator events identified in the network node during a predetermined rule duration. In some such embodiments, the rule comprises identifying the network node as being infected if a sum, average, or weighted average of the scores of indicator events is above a predetermined infection threshold. In some such embodiments, the rule comprises identifying the network node as being infected if the result of subtraction of the scores of indicator events from an initial value is below a predetermined infection threshold.

The browsing session used to determine whether or not a network node is infected by malware may be created in any suitable way. That being said, in some embodiments the browsing session is created by creating an empty browsing session, when the user directly accesses a specific URI, adding the specific URI to the browsing session, and adding to the browsing session each URI accessed through a URI already in the browsing session, as described hereinabove with reference to FIGS. 2 and 3.

It is appreciated that though indicator event identifier 402, rule evaluator 404, and infection identifier 406 are illustrated as separate components, any two or more of them may be implemented in a single component or in a single logical circuit.

In some embodiments, device 400 identifies whether a node is infected by malware inline, or, as part of the normal traffic flow in the network. This can be carried out, for example, if device 400 forms part of a proxy, such that all traffic in the network is directed through the proxy, and the proxy identifies whether or not the node is infected.

Under the assumption that malware will communicate with its command and control via some form of automatic browsing directly accessing the command and control URI, in some embodiments, in order to make transmission of traffic through such a proxy more efficient, the proxy may use one or more tools to identify whether or not a human user is conducting the browsing session. If the proxy identifies that a human user is conducting the browsing session, it is assumed that all communication in the browsing session is "clean" and does not include communication between malware and its command and control.

Many tools may be used to identify whether a human is conducting the browsing session. In some embodiments, the proxy is configured to identify that a human is conducting the browsing session by identifying mouse movements. This may be carried out, for example, by sending a script to the browser which script identifies mouse movements. In some embodiments the proxy is configured to identify that a human is conducting the browsing session by sending a Captcha challenge to the user and waiting for a response from the user. In some embodiments the proxy is configured to identify that a human is conducting the browsing session by identifying a CPU usage pattern which corresponds to human use. For example, the proxy may send to the browser a script that checks whether the CPU has been utilized for a defined period of time. Unexpectedly low utilization of the CPU during the defined period of time is indicative of non-human browsing.

In some embodiments, device 400 identifies whether a node is infected by malware out-of-line, or, separately from the normal traffic flow in the network. This can be carried out, for example, if device 400 is connected to or forms part of a mirror port in a switch, and receives the traffic in the network through the switch or using the ICAP protocol. Device 400 can then analyze the traffic in the network and identify whether or not nodes in the network are infected without disrupting or slowing down traffic in the network.

In some embodiments, in order to appear as if it is working inline, device 400 generates spoofed network traffic, and uses the spoofed traffic to identify whether or not a human user is conducting the browsing session, in a similar manner to that described above with respect to inline analysis of the traffic.

Figure 6:
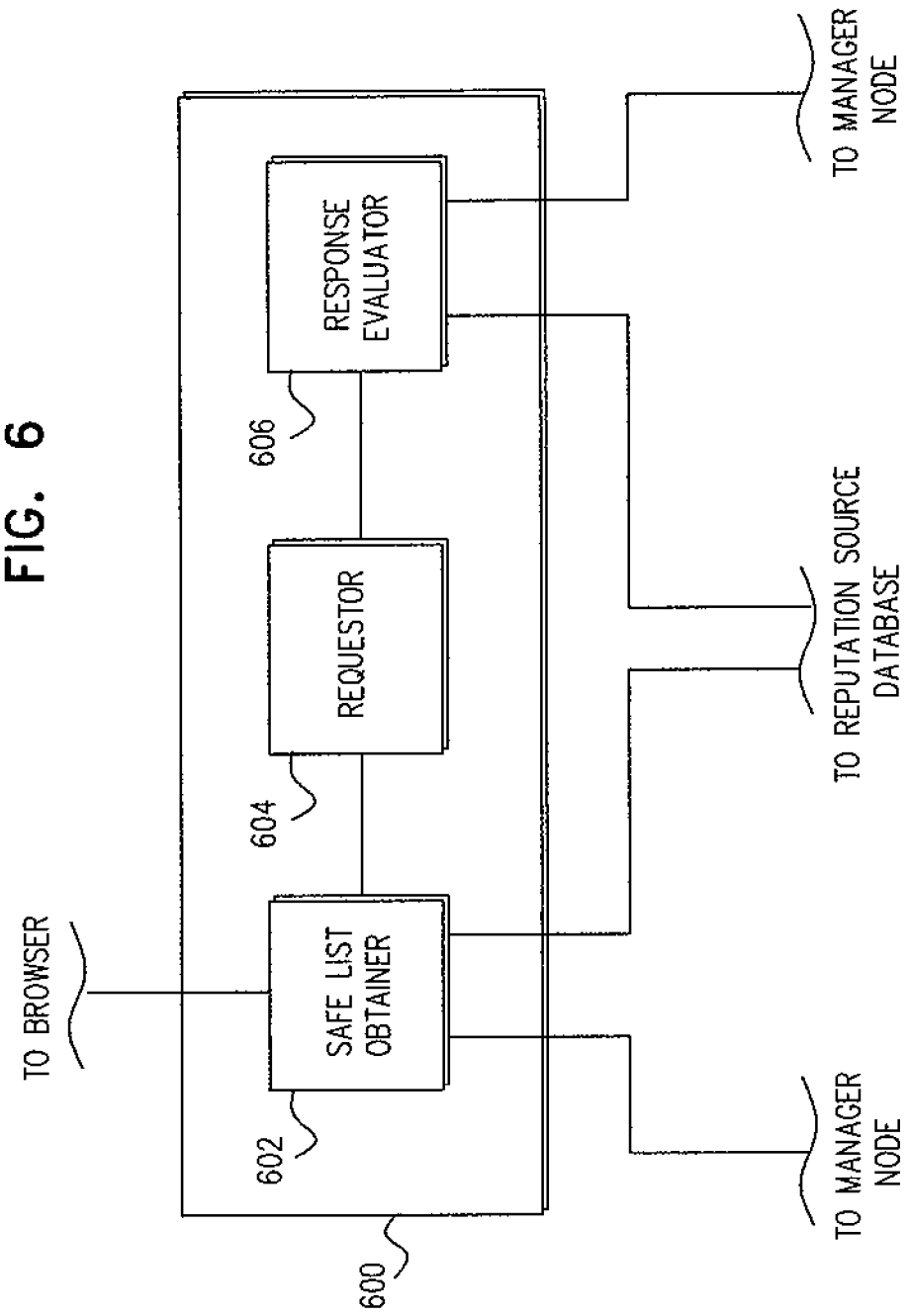
FIG. 6 is a block diagram of an embodiment of a device for identifying and stopping communication traffic between an infected network node and a malicious URI in accordance with an embodiment of the teachings herein.
Figure 7:
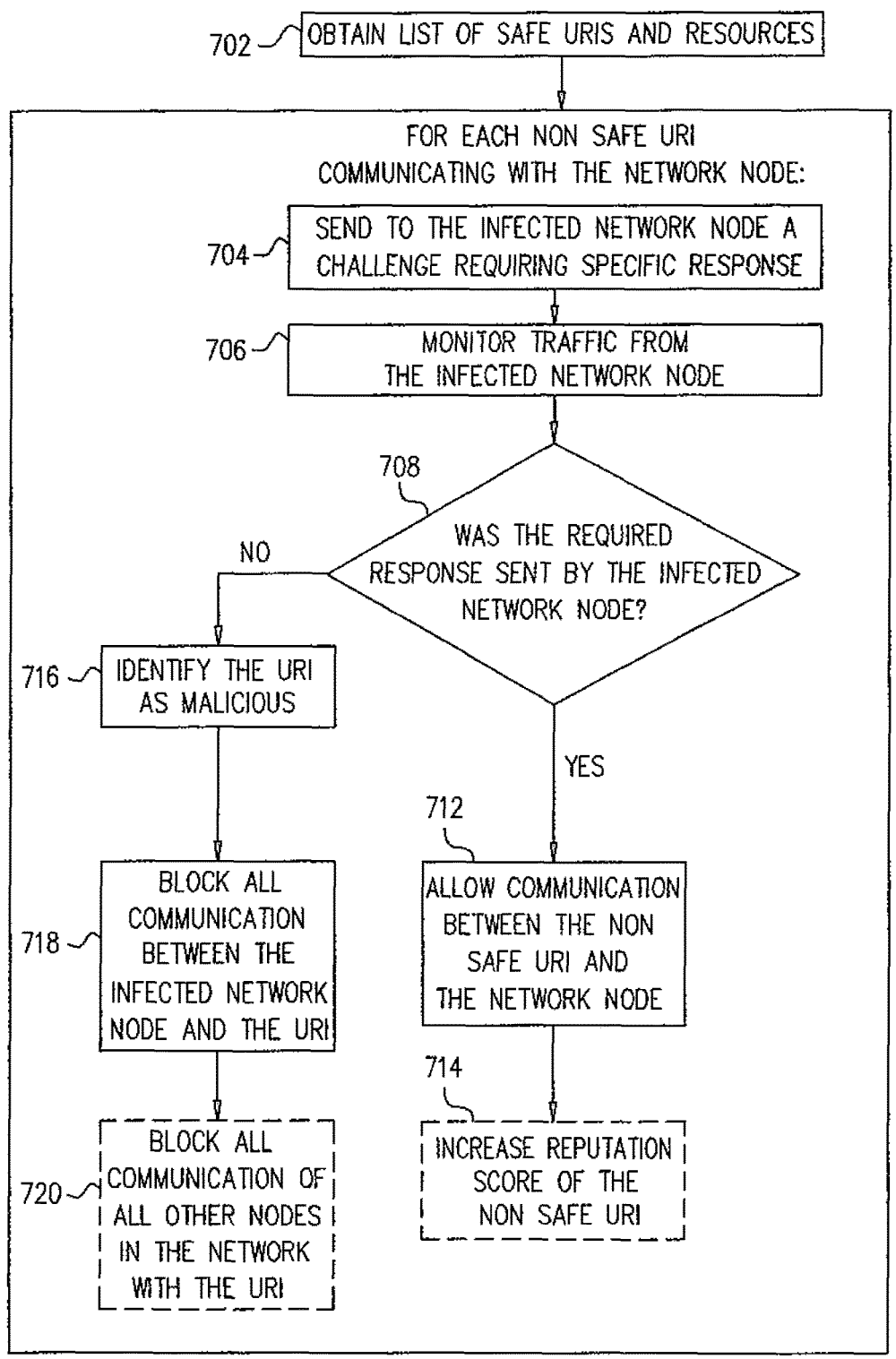
FIG. 7 is a flow chart of an embodiment of a method for identifying and stopping communication traffic between an infected network node and a malicious URI in accordance with an embodiment of the teachings herein.

Reference is now made to FIG. 6, which is a block diagram of an embodiment of a device 600 for identifying and stopping communication traffic between an infected network node and a malicious URI in accordance with an embodiment of the teachings herein, and to FIG. 7, which is a flow chart of an embodiment of a method for identifying and stopping communication traffic between an infected network node and a malicious URI in accordance with an embodiment of the teachings herein.

Device 600 illustrated in block diagram form in FIG. 6 is an embodiment of a device configured to carry out the logic of the process illustrated in the flow chart of FIG. 7. Device 600 may form part of the processor of a node for monitoring traffic in a network, such as internal guards 106, 126, or 146 or external guards 112, 132, or 152 of FIG. 1.

As seen in FIG. 6, device 600 includes a safe list obtainer 602, configured to obtain a list of safe URIs identifying safe resources, otherwise known as a URI white-list, at step 702 in FIG. 7. In some embodiments, safe list obtainer 602 is functionally associated with or is in communication with at least one of a browser, a reputation score database similar to that described hereinabove with reference to FIGS. 2 and 3, and a manager node of the network, such as node 162 of FIG. 1.

Safe list obtainer 602 may obtain the safe list using any suitable method known in the art. However, in some embodiments, safe list obtainer 602 obtains at least part of the list using the method described hereinabove with reference to FIG. 3. In some such embodiments, safe list obtainer 602 includes one or more logical circuits representing the elements of and/or functioning as device 200.

In some embodiments, safe list obtainer 602 is configured to obtain at least part of the safe list by identifying automatically generated communications with resources that are known to be safe.

In some embodiments, the resources known to be safe are identical for multiple networks. For example, though downloading of software updates such as Microsoft® updates and the like comprises automatic browsing and not human user browsing, because the origin of the software updates is known to be safe, a URI associated with this origin is included in the list of safe URIs.

In some embodiments, the resources known to be safe are specific to the network, the network node, or an organization to which the network belongs. For example, network nodes in a hospital may automatically access updates from the Center for Disease Control, which may be considered safe communication because the origin—the Center for Disease Control—is a known origin for the hospital network.

In some embodiments, safe list obtainer 602 is configured to obtain at least part of the safe list by including in the list URIs identified as safe URIs in other nodes in the network and/or in other networks. Similarly, in some embodiments safe list obtainer 602 is configured to obtain at least part of the safe list by excluding from the list URIs that were identified as malicious or unsafe by another node in the network and/or by another network. Indications of URIs previously identified as malicious or as safe may be provided to the safe list obtainer 602 from a manager node in communication therewith, similar to manager node 162 of FIG. 1. As mentioned hereinabove with reference to FIG. 1, the manager node may receive information regarding safe and/or malicious URIs from data collection servers which collect URI data from many networks.

Functionally associated with safe list obtainer 602 is a requestor 604, configured, for each communication of an infected network node with a specific URI not included in the safe list obtained by safe list obtainer 602, to send to the infected network node a challenge requiring a specific response, as seen at step 704 of FIG. 7. In some embodiments, as described hereinbelow with reference to inline processing, the challenge is sent to the infected network node prior to communicating with the specific URI for the first time in a new connection, if the URI is not included in the safe list at the time of such first communication therewith. In some embodiments, as described hereinbelow with reference to out-of-line processing, requestor 604 is configured to send the challenge to the infected network node as soon as possible, typically prior to receipt of a reply communication from the specific URI, which may be malicious.

The challenge sent by requestor 604 may require any suitable response, and typically requires a response which is indicative of human browsing at the infected network node. In some embodiments, the requestor 604 is configured to send a challenge, typically including an HTTP status code 302 redirecting to the specific URI, and requiring a response, typically comprising specific browser operations. In some embodiments, the requestor 604 is configured to send a challenge requiring a cookie as the response. In some embodiments, the requestor 604 is configured to send a Captcha challenge as the challenge. In some embodiments, the requestor 604 is configured to send a challenge requiring running of a program or script, such as a javascript code segment, on the node to calculate a value, and providing the calculated value as the response.

A response evaluator 606, functionally associated with requestor 604, is configured to identify that requestor 604 sent a challenge to the infected network node with respect to the specific URI not included in the safe list, and to monitor all traffic from the infected network node, at step 706 of FIG. 7, in order to identify whether the required response to the challenge is provided by the infected network node, at step 708 of FIG. 7.

If at step 708 response evaluator 606 identifies that the required response was received from the infected network node with respect to the specific URI, this indicates that the specific URI is not malicious, and device 600 allows communication between the specific URI and the infected network node at step 712 of FIG. 7. In some embodiments, response evaluator 606 is functionally associated with a reputation score database (not shown) similar to the reputation score database used in the method of FIG. 3 described hereinabove, and following receipt of the required response, increases the reputation score of the specific URI in the database, as seen at step 714 of FIG. 7.

If at step 708 response evaluator 606 identifies that the required response was not provided by the infected network node for the specific URI, at step 716 device 600 identifies the URI as malicious. Subsequently, device 600 blocks all communication between the infected network node and the specific URI at step 718. In some embodiments, in order to prevent other nodes in the network from accessing the specific URI, device 600 additionally notifies a network manager node, such as manager node 162 of FIG. 1, that the specific URI was found to be malicious, so that the network manager node can ensure that all communication between all other nodes in the network and/or in other networks with the specific URI is blocked, at step 720 of FIG. 7.

In some embodiments (not illustrated in FIG. 7), device 600 also blocks all communication between the infected network node and any URI within a domain or website including the specific URI which was identified as malicious.

It is appreciated that though safe list obtainer 602, requestor 604, and response evaluator 606 are illustrated as separate components, any two or more of them may be implemented in a single component or in a single logical circuit.

In some embodiments, device 600 monitors the traffic coming to and sent from an infected network node as part of the normal traffic flow in the network. This can be carried out, for example, if device 600 forms part of a proxy, such that all traffic in the network is directed through the proxy.

In some embodiments, device 600 monitors the traffic coming to and sent from an infected node out-of-line, or, separately from the normal traffic flow in the network. This can be carried out, for example, if requestor 604 spoofs the identity of the web server where the specific URI resides, and sends to the infected network node a challenge requiring a specific response as described hereinabove.

In the context of the present application and claims, the term "node" relates to any machine forming part of a network, including, inter alia, end user computers, servers, proxies, ports, printers, scanners, fax machines, copiers, imaging machines such as X-ray machines and MRI machines, and in general to any machine using a CPU and an operating system which is connected to an organization's network.

In the context of the present application and claims, the term "resource" relates to any file or component of the network which can be accessed using a URI and with which a node can communicate, including, inter alia, web pages, images, documents, sound files, multimedia files, executable files, scripts, applets, and programs.

In the context of the present application and claims, the terms "malware" and "advanced persistent threat" may be used interchangeably, and relate to any type of software which can enter a node or a network, remain in the node or network, and collect information about the node or network and/or make changes to or manipulate the node or network. Malware may be permitted by the user to enter the node or network, typically without the user knowing that the software he allowed into the node or network is malicious, or may enter the node or network without the user knowing about it. Malware may include, inter alia, viruses, worms, Trojan horses, adware, spyware, bots, bugs, and rootkits. Malware may be independently operated and controlled, or may be operated and controlled remotely by a hacker that constantly communicates with the malware using different mechanisms such as web traffic, USB devices, and the like.

In the context of the present application and claims, the terms "malicious URI" and "malicious resource" relate to any URI or network resource identified thereby which cause malware to enter or be installed on a node or network, or which control and/or command malware already infecting a node or network.

In the context of the present application and claims, the term "command and control" relates to a resource that communicates with malware already in a node or a network, and instructs the malware what actions to take or what data to collect.

In the context of the present application and claims, the terms "safe URI" and "safe resource" relate to any URI or resource which was established as not being a malicious URI or a malicious resource. The safety of a URI or resource may be established in any suitable way, including ways commonly known in the art.

In the context of the present application and claims, the term "infection rule" is any rule that, when fulfilled, is indicative of a network node being infected by malware.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A method for identifying whether a network node is infected by malware, the method comprising:
    identifying indicator events for each of a plurality of anomaly indicators, by:
        counting a number of occurrences of an anomaly indicator in at least one of a network node and a network during a predetermined time duration; and
        if said number of occurrences of said anomaly indicator during said predetermined time duration is greater than a predetermined event threshold, identifying an indicator event associated with said anomaly indicator during said predetermined time duration and assigning an expiration duration to said indicator event;
    determining whether non-expired identified indicator events fulfill at least one predetermined infection rule; and
    if said identified indicator events fulfill at least one said predetermined infection rule, identifying said network node as infected by malware,
    wherein at least one said predetermined infection rule comprises a rule relating to a set of indicator events seen during a predetermined rule duration.

2. The method of claim 1, wherein at least one of said plurality of anomaly indicators comprise a global anomaly indicator.

3. The method of claim 1, wherein at least one of said plurality of anomaly indicators comprises a local anomaly indicator.

4. The method of claim 1, wherein at least one of said plurality of anomaly indicators is identified in a browsing session and comprises at least one of:
- an anomaly indicator relating to URI access out of context of said browsing session;
- an anomaly indicator relating to said browsing session requesting access to a resource that does not meet a pre-determined configuration profile;
- an anomaly indicator relating to correspondence between DNS queries and IP address accesses;
- an anomaly indicator relating to a number of TCP connections opened during said browsing session;
- an anomaly indicator relating to a value of a User Agent header of an HTTP request in said browsing session;
- an anomaly indicator relating to types of traffic passing through a single TCP connection;
- an anomaly indicator relating to longevity of domains accessed during said browsing session;
- an anomaly indicator relating to the HTML content of an HTTP response in said browsing session;
- an anomaly indicator relating to the HTML tags of an HTTP response in said browsing session;
- an anomaly indicator relating to the HTML content of all HTTP responses in said browsing session;
- an anomaly indicator relating to the HTML tags of all HTTP responses in said browsing session; and
- an anomaly indicator relating to the length of the said browsing session.

5. The method of claim 1, wherein at least one said predetermined infection rule comprises a rule relating to a sequence of indicator events seen during a predetermined rule duration.

6. The method of claim 1, also comprising assigning a score to each said identified indicator event,
wherein at least one said predetermined infection rule comprises a rule relating to an arithmetic operation carried out on said scores of indicator events identified in said network node during a predetermined rule duration.

7. The method of claim 1, also comprising creating a browsing session by:
creating an empty browsing session;
upon identifying directly access to a specific URL adding said specific URI to said browsing session; and
adding to said browsing session each URI accessed through a URI already in said browsing session,
wherein said identifying indicator events comprises identifying at least one said indicator event in said browsing session.

8. The method of claim 1, wherein said identifying indicator events comprises identifying at least one indicator event in traffic within said network.

9. The method of claim 1, wherein said identifying indicator events comprises identifying at least one indicator event in traffic between said network and at least one IP address outside said network.

10. The method of claim 1, wherein said method is carried out inline, and wherein said method also comprises directing all traffic in said network through a proxy, such that said identifying indicator events and said identifying said network node as infected by malware are carried out by said proxy.

11. The method of claim 10, also comprising using at least one tool to identify whether a human user is conducting a browsing session used for said identifying indicator events.

12. The method of claim 1, wherein said method is carried out out-of-line, and wherein said identifying indicator events is carried out using at least one mirror port, without disrupting traffic flow in said network.

13. A device for identifying whether a network node is infected by malware, the device comprising:
an indicator event identifier, configured to identify indicator events for each of a plurality of anomaly indicators, by:
counting a number of occurrences of an anomaly indicator in at least one of a network node and a network during a predetermined time duration; and
if said number of occurrences of said anomaly indicator during said predetermined time duration is greater than a predetermined event threshold, identifying an indicator event associated with said anomaly indicator during said predetermined time duration and assigning an expiration duration to said identified indicator event;
a rule evaluator functionally associated with said indicator event identifier and configured to determine whether non-expired indicator events identified by said indicator event identifier fulfill at least one predetermined infection rule relating to a set of indicator events seen during a predetermined rule duration; and
an infection identifier functionally associated with said rule evaluator and configured to identify said network node as infected by malware if said rule evaluator determined that said identified indicator events fulfill said at least one predetermined infection rule.

14. The device of claim 13, wherein said indicator event identifier is configured to identify indicator events for at least one global anomaly indicator.

15. The device of claim 13, wherein said indicator event identifier is configured to identify indicator events for at least one local anomaly indicator.

16. The device of claim 13, wherein said indicator event identifier is configured to identify indicator events for at least one of said plurality of anomaly indicators in a browsing session of said network node, said plurality of anomaly indicators comprising at least one of:
- an anomaly indicator relating to URI access out of context of said browsing session;
- an anomaly indicator relating to said browsing session requesting access to a resource that does not meet a pre-determined configuration profile;
- an anomaly indicator relating to correspondence between DNS queries and IP address accesses;
- an anomaly indicator relating to a number of TCP connections opened during said browsing session;
- an anomaly indicator relating to a value of a User Agent header of an HTTP request in said browsing session;
- an anomaly indicator relating to types of traffic passing through a single TCP connection; and
- an anomaly indicator relating to longevity of domains accessed during said browsing session;
- an anomaly indicator relating to the HTML content of an HTTP response in said browsing session;
- an anomaly indicator relating to the HTML tags of an HTTP response in said browsing session;

an anomaly indicator relating to the HTML content of all HTTP responses in said browsing session;
an anomaly indicator relating to the HTML tags of all HTTP responses in said browsing session; and
an anomaly indicator relating to the length of the said browsing session.

17. The device of claim 13, wherein said rule evaluator is further configured to determine whether said identified indicator events fulfill at least one infection rule relating to a sequence of indicator events seen during a predetermined rule duration.

18. The device of claim 13, wherein:
said indicator event identifier is configured to assign a score to each said identified indicator event; and
said rule evaluator is further configured to determine whether said identified indicator events fulfill at least one infection rule relating to an arithmetic operation carried out on said scores of said indicator events identified in said network node during a predetermined rule duration.

19. The device of claim 13, wherein said indicator event identifier comprises an internal indicator event identifier configured to identify indicator events in traffic within a Local Area Network (LAN) of which said network node forms part.

20. The device of claim 13, wherein said indicator event identifier comprises an external indicator event identifier configured to identify indicator events in traffic between said network and at least one IP address outside said network.

21. The device of claim 13, the device comprising a proxy configured to have all network traffic directed therethrough, wherein said indicator event identifier is configured to use inline traffic for identifying said indicator events.

22. The device of claim 21, also comprising a human user browsing identifier configured to use at least one tool to identify whether a human user is conducting a browsing session on said network node.

23. The device of claim 13, said device configured to identify an infected network node using out-of-line network traffic.

24. A method for identifying whether a network node is infected by malware, the method comprising:
identifying indicator events for each of a plurality of anomaly indicators, by:
counting a number of occurrences of an anomaly indicator in at least one of a network node and a network during a predetermined time duration; and
if said number of occurrences of said anomaly indicator during said predetermined time duration is greater than a predetermined event threshold;
identifying an indicator event associated with said anomaly indicator during said predetermined time duration; and
assigning an expiration duration to said indicator event, the expiration duration being dependent on a type of said indicator event;
determining whether identified indicator events, whose expiration duration has not passed, fulfill at least one predetermined infection rule; and
if said identified indicator events fulfill at least one said redetermined infection rule, identifying said network node as infected by malware.

* * * * *